United States Patent
Duenas et al.

(10) Patent No.: US 12,524,058 B2
(45) Date of Patent: Jan. 13, 2026

(54) DYNAMIC ADJUSTMENT OF POWER MODES

(71) Applicants: ADVANCED MICRO DEVICES, INC., Santa Clara, CA (US); ATI TECHNOLOGIES ULC, Markham (CA)

(72) Inventors: Alexander Sabino Duenas, Markham (CA); Ashwini Chandrashekhara Holla, Markham (CA); Raman M. Srinivasan, Austin, TX (US); Michael J. Austin, Austin, TX (US); Xinzhe Li, Markham (CA); Jun Huang, Markham (CA)

(73) Assignees: ADVANCED MICRO DEVICES, INC., Santa Clara, CA (US); ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 17/564,075

(22) Filed: Dec. 28, 2021

(65) Prior Publication Data

US 2023/0205301 A1    Jun. 29, 2023

(51) Int. Cl.
G06F 1/32       (2019.01)
G06F 1/3215     (2019.01)
G06F 1/3234     (2019.01)

(52) U.S. Cl.
CPC .......... G06F 1/3234 (2013.01); G06F 1/3215 (2013.01)

(58) Field of Classification Search
CPC ....................................................... G06F 1/32
See application file for complete search history.

(56) References Cited

U.S. PATENT DOCUMENTS

| | | | | |
|---|---|---|---|---|
| 8,397,087 B1* | 3/2013 | Gardner | .................. | G06F 1/329 |
| | | | | 713/340 |
| 2002/0138778 A1* | 9/2002 | Cole | ..................... | G06F 1/3296 |
| | | | | 713/330 |
| 2013/0232360 A1* | 9/2013 | Chen | ..................... | G06F 1/3268 |
| | | | | 713/323 |
| 2014/0366040 A1* | 12/2014 | Parker | ..................... | G06F 9/542 |
| | | | | 719/318 |
| 2015/0177821 A1* | 6/2015 | Senthinathan | ........ | G06F 9/3887 |
| | | | | 713/324 |
| 2022/0326750 A1* | 10/2022 | Nakamura | ................ | G06F 1/26 |

* cited by examiner

*Primary Examiner* — Paul B Yanchus, III

(57) ABSTRACT

Dynamic adjustment of power modes including: detecting an application identified in an application power policy; limiting an application power consumption of a computing component based on the application power policy; monitoring power consumption of a computing component; and selecting a power mode based on the monitored power consumption of the computing component and a power consumption threshold for each of a plurality of power modes.

22 Claims, 8 Drawing Sheets

DYNAMIC ADJUSTMENT OF POWER MODES

BACKGROUND

Computing systems are typically subject to power constraints that affect how much power a computing system is able to use. Battery powered computers need to efficiently manage power to extend battery life. Desktop computers use power management to reduce the operating temperature and extend component life. Fan noise can also be a problem when cooling computing system. Typically, computing systems have multiple power states to control how much power the computing system draws. In different scenarios, different power states are preferable. When operating on battery power, a low power state is preferred and when operating on wired power, a more aggressive power state is preferred. In some instances, a maximum power state is preferred, such as when performing resource intensive tasks like video editing. Each of these power states can be selected by a user depending on the user's individual preferences.

DETAILED DESCRIPTION

Figure 1:
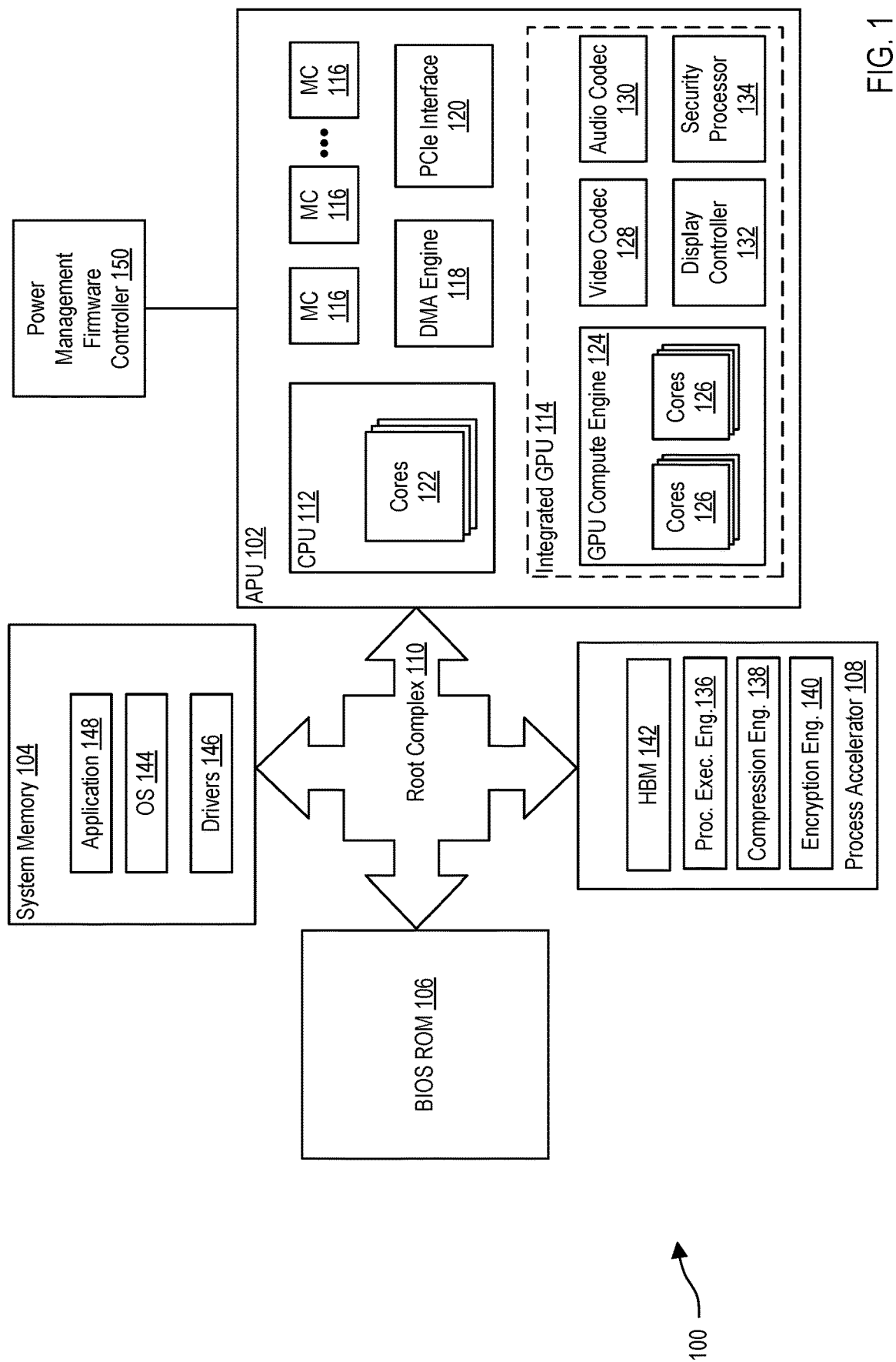
FIG. 1 is a block diagram of an example processor for dynamic adjustment of power modes according to some implementations.

Implementations in accordance with the present disclosure provide for dynamic adjustment of power modes of a computing system without requiring user intervention. Implementations allow for the computing system to automatically select a power mode based on the power trends of applications running on the computing system and provide for limiting power hungry applications to avoid switching power modes unnecessarily.

In some implementations, an apparatus for dynamic adjustment of power modes includes a computer processor and a computer memory operatively coupled to the computer processor. The computer memory has disposed therein computer program instructions that, when executed by the computer processors, cause the apparatus to carry out: detecting an application identified in an application power policy; limiting an application power consumption of a computing component based on the application power policy; monitoring power consumption of a computing component; and selecting a power mode based on the monitored power consumption of the computing component and a power consumption threshold for each of a plurality of power modes.

In some implementations, the computer program instructions further cause the apparatus to carry out: configuring, for each of a plurality of power modes, operational parameters of the computing component; and configuring a plurality of power consumption thresholds for each of the plurality of power modes; wherein the power mode is among the plurality of power modes.

In some implementations, selecting a power mode includes: while operating in a first power mode among the plurality of power modes, determining that a current power consumption of the computing component exceeds a power consumption threshold among the plurality of power consumption thresholds; and switching to a second power mode among the plurality of power modes by dynamically adjusting power settings of the computing component based on the operational parameters associated with the second power mode.

In some implementations, selecting a power mode includes: while operating in a first power mode, determining that that a current power consumption falls below the power consumption threshold; and switching to a second power mode including dynamically re-adjusting the power settings of the computing component based on the operational parameters associated with the second power mode.

In some implementations, the computer program instructions further cause the apparatus to carry out averaging the power consumption of the computing component over a predetermined amount of time.

In some implementations, the computer program instructions further cause the apparatus to carry out receiving the operational parameters and the power consumption thresholds for each of the power modes by executing an Advanced Configuration and Power Interface (ACPI) call instruction.

In some implementations, configuring the plurality of power consumption thresholds for each one of the plurality of power modes includes at least one of setting a maximum voltage of the computing component, setting a maximum clock frequency of the computing component, setting a minimum clock frequency of the computing component, setting a maximum temperature of the computing component, setting a minimum temperature of the computing component, setting a minimum fan speed, and setting a maximum fan speed.

In some implementations, a method of dynamic adjustment of power modes includes: detecting an application identified in an application power policy; limiting an application power consumption of a computing component based on the application power policy; monitoring power consumption of a computing component; and selecting a power mode based on the monitored power consumption of the computing component and a power consumption threshold for each of a plurality of power modes.

In some implementations, selecting a power mode includes: configuring, for each of a plurality of power modes, operational parameters of the computing component; and configuring a plurality of power consumption thresholds for each of the plurality of power modes; wherein the power mode is among the plurality of power modes.

In some implementations, selecting a power mode includes: while operating in a first power mode among the plurality of power modes, determining that a current power consumption of the computing component exceeds a power consumption threshold among the plurality of power consumption thresholds; and switching to a second power mode among the plurality of power modes by dynamically adjusting power settings of the computing component based on the operational parameters associated with the second power mode.

In some implementations, selecting a power mode includes: while operating in a first power mode, determining that that a current power consumption falls below the power consumption threshold; and switching to a second power mode including dynamically re-adjusting the power settings of the computing component based on the operational parameters associated with the second power mode.

In some implementations, the method further includes averaging the power consumption of the computing component over a predetermined amount of time.

In some implementations, the method further includes receiving the operational parameters and the plurality of power consumption thresholds for each one of the plurality of power modes from a third party entity by executing an Advanced Configuration and Power Interface (ACPI) call instruction.

In some implementations, configuring the plurality of power consumption thresholds for each one of the plurality of power modes includes at least one of setting a maximum voltage of the computing component, setting a maximum clock frequency of the computing component, setting a minimum clock frequency of the computing component, setting a maximum temperature of the computing component, setting a minimum temperature of the computing component, setting a minimum fan speed, and setting a maximum fan speed.

In some implementations, a computer program product is configured dynamic adjustment of power modes. The computer program product is disposed upon a computer readable medium. The computer program product includes computer program instructions that, when executed, cause a computer to carry out the steps of: detecting an application identified in an application power policy; limiting an application power consumption of a computing component based on the application power policy; monitoring power consumption of a computing component; and selecting a power mode based on the monitored power consumption of the computing component and a power consumption threshold for each of a plurality of power modes.

In some implementations, the computer program instructions further cause a computer to carry out the steps of: configuring, for each of a plurality of power modes, operational parameters of the computing component; and configuring a plurality of power consumption thresholds for each of the plurality of power modes; wherein the power mode is among the plurality of power modes.

In some implementations, the computer program instructions further cause a computer to carry out the steps of: while operating in a first power mode among the plurality of power modes, determining that a current power consumption of the computing component exceeds a power consumption threshold among the plurality of power consumption thresholds; and switching to a second power mode among the plurality of power modes by dynamically adjusting power settings of the computing component based on the operational parameters associated with the second power mode.

In some implementations, the computer program instructions further cause a computer to carry out the steps of: while operating in a first power mode, determining that that a current power consumption falls below the power consumption threshold; and switching to a second power mode including dynamically re-adjusting the power settings of the computing component based on the operational parameters associated with the second power mode.

In some implementations, the computer program instructions further cause a computer to carry out the step of averaging the power consumption of the computing component over a predetermined amount of time.

In some implementations the computer program instructions further cause a computer to carry out the step of receiving the operational parameters and the power consumption thresholds for each of the power modes by executing an Advanced Configuration and Power Interface (ACPI) call instruction.

In some implementations configuring the plurality of power consumption thresholds during a BIOS setup for each one of the plurality of power modes includes: configuring the plurality of power consumption thresholds for each one of the plurality of power modes includes at least one of setting a maximum, voltage of the computing component, setting a maximum clock frequency of the computing component, setting a minimum clock frequency of the computing component, setting a maximum temperature of the computing component, setting a minimum temperature of the computing component, setting a minimum fan speed, and setting a maximum fan speed.

Implementations in accordance with the present disclosure will be described in further detail beginning with FIG. 1. Like reference numerals refer to like elements throughout the specification and drawings. FIG. 1 sets forth a block diagram of a non-limiting example system 100 for dynamic adjustment of power states in accordance with some embodiments of the present disclosure. The example system 100 is implemented as a computing device, including for example, a personal computer, gaming console, smart phone, mobile device, workstation computer, server, and the like. The example system 100 includes a processor 102, system memory 104, basic input/output system (BIOS) read only memory (ROM) 106, a process accelerator 108, and a root complex 110 interconnecting the processor 102, the system memory 104, the BIOS ROM 106, and the process accelerator 108. Additionally, the example system 100 includes a power management firmware controller (PMFW) 150 operably coupled to the processor 102. The components shown are illustrative and, in some implementations, other components are connected to or are in communication with the computing system 100. Other configurations are possible, and the system of FIG. 1 is only one example of a system 100 for dynamic adjustment of power states.

In the example system 100 of FIG. 1, the processor 102 is an accelerated processing unit (APU) that integrates a central processing unit (CPU) 112 and an integrated graphics processing unit (iGPU) 114 (referred to herein as an "integrated GPU"). In some implementations, the CPU 112 and the integrated GPU 114 are implemented on the same chip and thus share a number of components and interfaces such as system memory 104, memory controllers 116 and direct memory addressing (DMA) engines 118 for accessing system memory 104, bus interfaces such as a personal computing interface express (PCIe) interface 120, and other interfaces and adapters not depicted in FIG. 1 such as a network interface, universal serial bus (USB) interface, persistent storage interface such as hard disk drive (HDD) and solid state drive (SSD) interface, and so on. The CPU 112 includes one or more cores 122 (i.e., execution engines), cache structures (not shown), pipeline components (also not shown), and so on. The CPU 112 and other shared components are connected to the GPU 114 via a high-speed on-chip communications fabric (not shown). In other examples, the processor 102 has less than all of the components illustrated in FIG. 1. For example, in some instances the processor 102 is implemented without the integrated GPU 114.

In the example system 100 of FIG. 1, the integrated GPU 114 includes a GPU compute engine 124 that includes multiple single instruction multiple data (SIMD) processing cores 126 having many parallel processing units (not shown). The GPU compute engine 124 also includes other components not depicted in FIG. 1 such as geometry processors, rasterizers, graphic command processors, hardware schedulers, asynchronous compute engines, caches, data shares, and so on. In the example of FIG. 1, the integrated GPU 114 also includes hardware accelerators in the form of application specific integrated circuits or functional logic blocks such as a video encoder/decoder 128 (i.e., a "codec") for accelerated video encoding and decoding, an audio codec 130 for accelerated audio encoding and decoding, a display controller 132 for accelerated display processing, and a security processor 134 for accelerated security protocol enforcement and compliance.

In the example system 100 of FIG. 1, the processor 102 communicates with a process accelerator 108 over the root complex 110. The root complex 110 comprises a plurality of peripheral connect interface express (PCIe) interfaces or a compute express link (CXL) communicatively coupling the processor 102, the process accelerator 108, the system memory 104, and the BIOS ROM 106. In some examples, the processor 102 and the process accelerator 108 are implemented on the same substrate (e.g., a printed circuit board). In other examples, the process accelerator 108 is implemented on video or graphics card that is separate from the substrate of the processor 102.

The process accelerator 108 in the example of FIG. 1 includes a process execution engine 136 that has multiple SIMD processing cores having many parallel processing units (not shown). The process execution engine 136 also includes other components not depicted in FIG. 1 such as memory controllers, DMA engines, machine learning processors, geometry processors, rasterizers, graphic command processors, hardware schedulers, asynchronous compute engines, caches, data shares, and so on depending on the functionality of the process accelerator 108. In the example of FIG. 1, the process accelerator 108 also includes hardware accelerators in the form of application specific integrated circuits or functional logic blocks such as a compression engine 138 for accelerating the decompression and/or the compression of data and an encryption engine 140 for accelerating the decryption and/or encryption of data. The process accelerator 108 also includes high bandwidth memory (HBM) 142.

In the example system 100 of FIG. 1, the system memory 104 (e.g., dynamic random access memory (DRAM)) hosts an operating system 144 that interfaces with device drivers 146. The device drivers are a group of files that enable one or more hardware devices to communicate with the operating system 144. The system memory 104 also hosts one or more applications 148.

In the example system 100 of FIG. 1, the PMFW 150 is a microcontroller that controls power functions of the example system 100. In some examples, the PMFW 150 dynamically manages system power limits and a fan policy based on a system 100 power mode. The PMFW 150 implements power related sensors for measuring power consumption and implements power controllers. Each component of the example system 100 has an associated power consumption. In some examples, the power consumption is measured by sensors integrated into the example system 100 and communicating through the PMFW 150. In addition to measuring the power consumption, other sensors measure other characteristics such as temperature and frequency of individual components. The example system 100 controls at least some of the components power consumption by altering operational parameters of the component such as voltages, frequencies, and power states by way of the PMFW 150.

Figure 2:
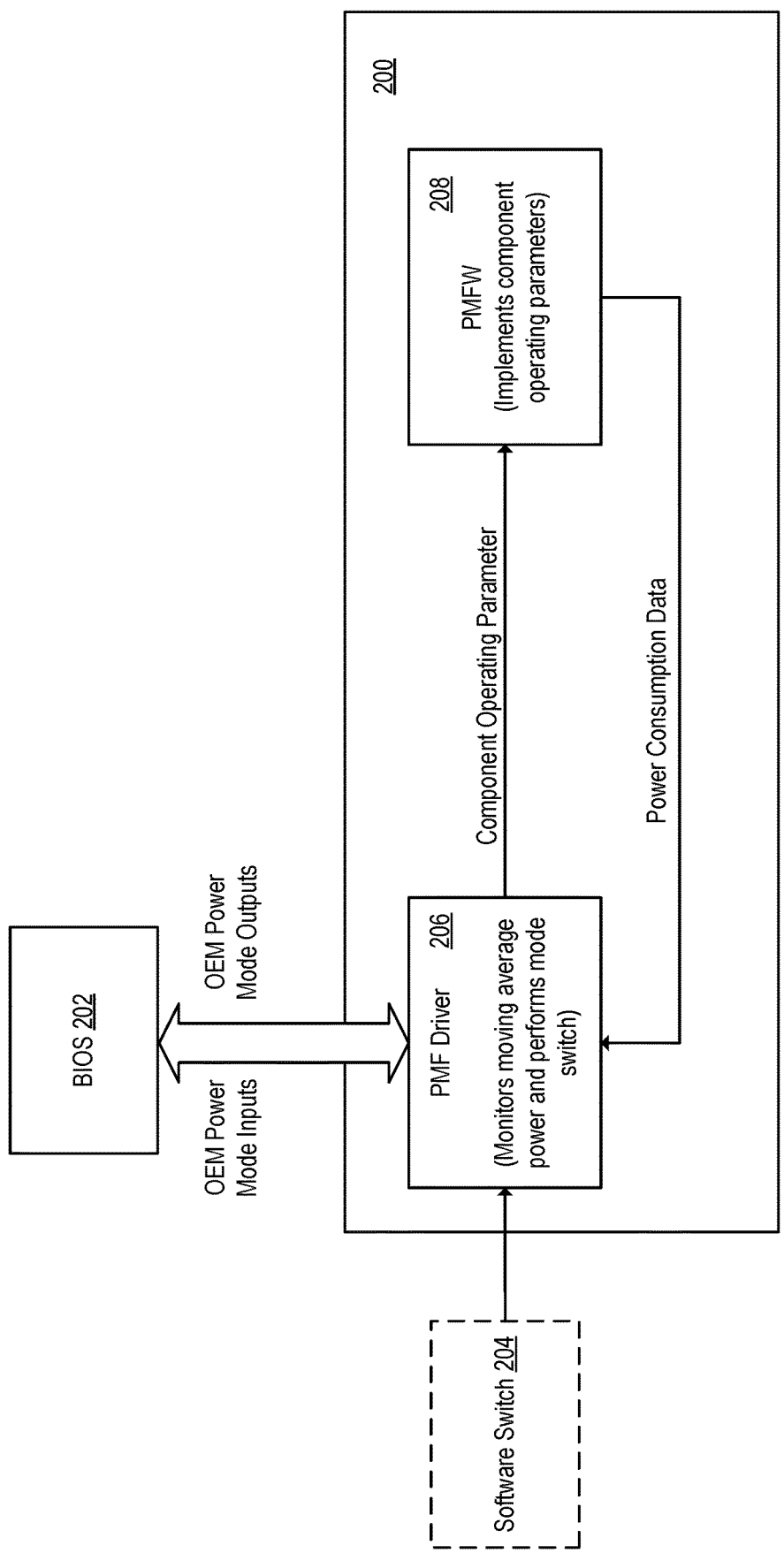
FIG. 2 is a block diagram of an example framework for dynamic adjustment of power modes according to some implementations.

FIG. 2 is a block diagram of a framework implementing dynamic adjustment of power modes for a system, such as example system 100 of FIG. 1. The framework of FIG. 2 includes power management components 200 implemented on a computing device, a BIOS 202, and optionally a software switch 204 for enabling and disabling the framework. The BIOS 202 is responsible for loading the operating system at startup and manages the interface between the operating system and hardware attached to the system. In some examples, the BIOS 202 is an Unified Extensible Firmware Interface. The power management components 200 include a Power Management Framework (PMF) driver 206 and a Power Management Firmware Controller (PMFW) 208.

The software switch 204 provides an option for a user to toggle between conventional power management and implementations of dynamic adjustment of power modes. In some implementations, an application provides the software switch 204. For example, an Original Equipment Manufacturer (OEM) can provide system software for management of the system which contains the software switch 204. In other implementations, the software switch 204 is a part of software provided by a hardware provider. For example, in some implementations a hardware driver includes the software switch 204. In still other implementations, the software switch 204 is implemented by an operating system.

In some implementations, when enabling dynamic adjustment of power modes using a software switch 204, existing options such as a slider for selection of a power mode are be disabled. For example, if the operating system includes a slider for selecting a power mode, selection of dynamic adjustment of power modes disables the slider. In some examples, the operating system notifies the user that manual selection of the power mode is not available when a user attempts to use the manual system.

The BIOS 202 includes information related to power modes and power thresholds for computer components. In some examples, the information related to power modes and power thresholds is set by an OEM for a specific hardware device of a computing system. In some examples, an OEM for a thin and light laptop might set the power modes and power consumption thresholds for computing components to a relatively low power consumption threshold. In another example, an OEM of a high-performance workstation might set the power modes and power consumption thresholds for computing components to a relatively high power consumption threshold. In each example, the OEM is able to tailor the power modes and power thresholds based on the OEM's specific needs for the computing device.

The PMF driver 206 monitors the power usage of a computing component of the system. In some examples, the PMF driver 206 monitors the power of a single computing component such as a CPU socket, or in other implementations the PMF driver 206 monitors the power consumption of multiple computing components such as a CPU socket, a video accelerator, and a hard drive. In still other examples, the PMF driver 206 monitors other aspects of a computing component such as an operating frequency. In some examples, the PMF driver 206 averages or otherwise normalizes the monitored power usage of the computing component it is monitoring.

The PMF driver 206 determines to switch power modes based on the power usage of a computing component as monitored by the PMF driver 206. In some examples, the determination to switch power modes is dependent upon the normalized power usage of the computing component. In other examples, the determination to switch power modes is dependent upon another measured characteristic such as a component's frequency. For example, in place of monitoring whether a power consumption thresholds is exceeded, the PMF driver 206 monitors a component's frequency and determines if a different power mode should be selected based on the component's frequency. The PMF driver 206 receives information related to power modes from the BIOS 202 and makes the determination to dynamically switch power modes based on a characteristic measured by the PMF driver 206 and the power mode information from the BIOS 202.

The PMFW 208 implements operational parameters of computing components of the system dependent on a current power mode based on information contained in the BIOS 202. The information contained in the BIOS 202 includes operational parameters such as a power controller to use for a computing component, a cooling policy for a computing component, and/or other operational parameters. The computing component uses these operational parameters to govern the performance of the computing component.

The PMFW 208 also collects information related to the operation of a computing component and provides the information to the PMF driver 206. In some examples, the PMFW 208 collects power information such as CPU socket power or other data such as temperature. In some examples, the information is collected in sampling windows to avoid continuous collection of data. In some examples, the sampling window is once every second, although in other examples the sampling window is less than or more than one second.

Figure 3:
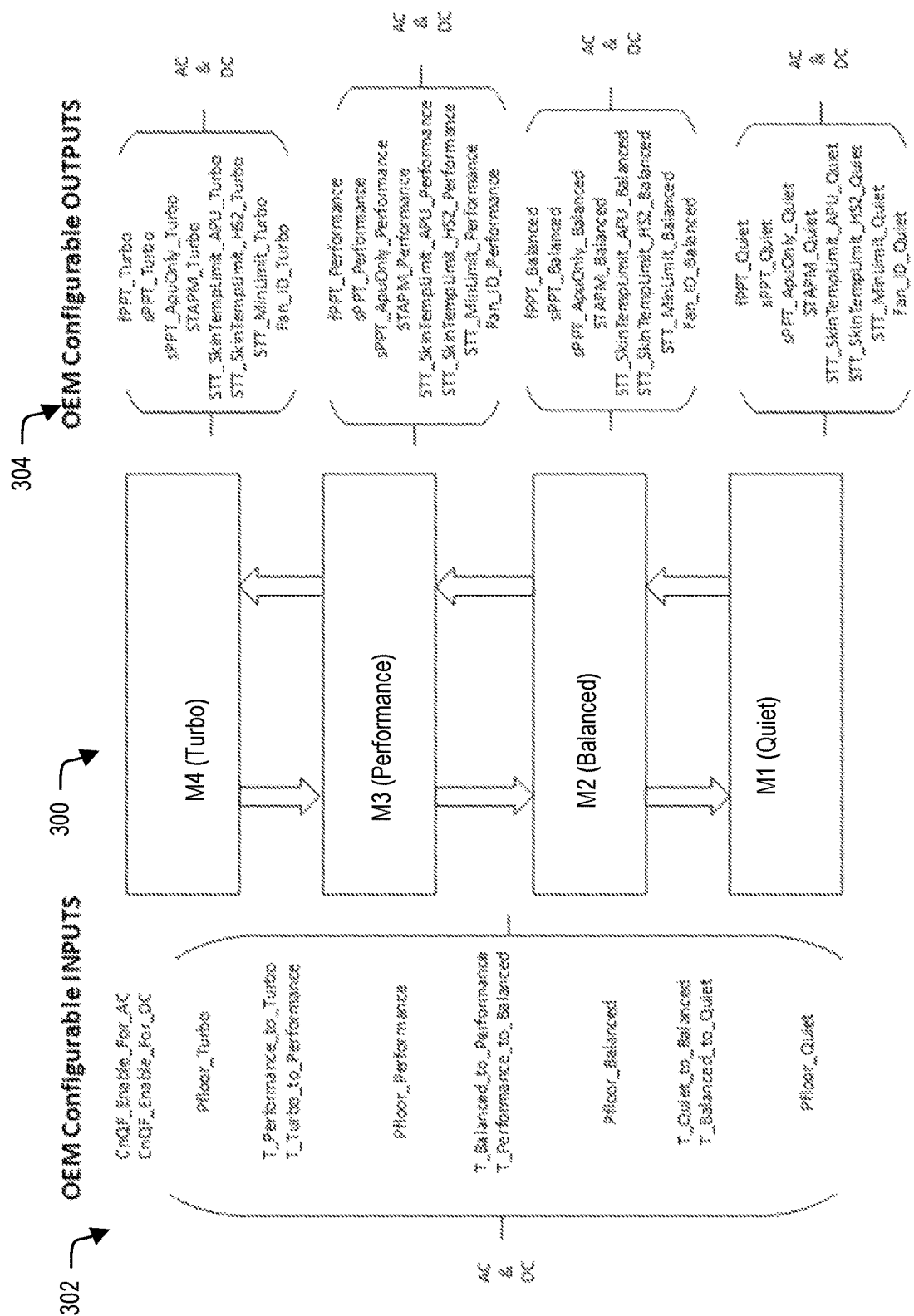
FIG. 3 is a diagram of example power states for a system implementing dynamic adjustment of power modes according to some implementations.

FIG. 3 is an example of power modes 300, configurable inputs 302, and configurable outputs 304 that are available for configuration by an OEM. In some implementations there are four power modes, M1, M2, M3, and M4. In other implementations there are more or less power modes. In this example, each power mode corresponds to a different power level such as quiet, balanced, performance, and turbo. Quiet is the lower power setting, balanced is the next higher power setting, the performance setting is one mode higher that balanced and turbo is the highest power setting. For each power mode, the BIOS stores information including the configurable inputs 302 and the configurable outputs 304. The configurable inputs 302 are used by the PMF driver 206 to determine a power mode 300 and the configurable outputs 304 contain operating parameters for the PMFW 208 to control computing components. The configurable inputs 302 include power consumption thresholds that are used determine when to switch between power modes 300 and optionally include a time component. In the example of FIG. 3, the configurable inputs include the following:

| | |
|---|---|
| Enable_For_AC | A flag indicating whether the dynamic adjustment of power modes is active when powered by AC. |
| Enable_For_DC | A flag indicating whether the dynamic adjustment of power modes is active when powered by DC. |
| Pfloor_Turbo | A power level for transitioning between the Turbo mode and a higher mode if available. |
| T_Performance_to_Turbo | A time component for determining whether to switch from Performance mode to Turbo mode. |
| T_Turbo_to_Performance | A time component for determining whether to switch from Performance mode to Turbo mode. |
| Pfloor_Performance | A power level for transitioning between the Performance mode and the Turbo mode. |
| T_Balanced_to_Performance | A time component for determining whether to switch from Balanced mode to Performance mode. |
| T_Performance_to_Balanced | A time component for determining whether to switch from Performance mode to Balanced mode. |
| Pfloor_Balanced | A power level for transitioning between the Balanced mode and a the Performance Mode. |
| T_Quiet_to_Balanced | A time component for determining whether to switch from Quiet mode to Balanced mode. |
| T_Balanced_to_Quiet | A time component for determining whether to switch from Balanced mode to Quiet mode. |
| Pfloor_Quiet | A power level for transitioning between the Quiet mode and the Balanced mode. |

The configurable outputs 304 include at least one of an output power controller to use for a given power mode 300, a maximum power level for the power mode 300, a fan speed controller for a power mode 300, and temperature limits for a power mode 300. In the example of FIG. 3, available configurable outputs for each power state include the following:

| | |
|---|---|
| fPPT | Fast power tracking, indicates a power controller type for controlling the system and a power limit. |
| sPPT | Slow power tracking, indicates a power controller type for controlling the system and a power limit.. |
| sPPT_ApuOnly | Slow power tracking for an Accelerated Processing Unit, indicates a power controller type for controlling the system and a power limit.. |

| | |
|---|---|
| STAPM | Skin temperature advanced power management, indicates a type of temperature tracking. |
| STT_SkinTempLimit_APU | Skin temperature tracking, indicates a maximum allowable skin temperature for an Accelerated Processing Unit. |
| STT_SkinTempLimit_HS2 | Skin temperature tracking, indicates a maximum allowable skin temperature for a chipset. |
| STT_MinLimit | Skin temperature tracking, indicates a minimum temperature for the system. |
| Fan_ID | A policy for controlling the speed of a fan. |

In some examples, if there are four power modes, the first power mode has a first power consumption threshold for a first power level (i.e., Pfloor_Turbo), a second first power consumption threshold for a second power level (i.e., Pfloor_Performance), a third first power consumption threshold for a third power level (i.e., Pfloor_Balanced), and a fourth first power consumption threshold for a fourth power level (i.e., Pfloor_Quiet). If the system reaches one of the first power consumption thresholds it switches between power modes. In some examples, each power mode further includes a time component (i.e. T_Balanced_to_Quiet) that indicates an amount of time the system can stay beyond a power floor before switching between power modes. In some examples, the time component is a time for averaging measured power consumption. For example, the system can briefly pass a first power consumption threshold and not change power modes, but if it remains past the first power consumption threshold for a specified amount of time, or the average exceeds the first power consumption threshold the power mode will change. Additionally, in some examples, each power mode has two separate time components. One for determining to go up a power mode and one for determining to go down a power mode. For example, in some instances the system has a relatively higher time component for increasing the power mode and a relatively shorter time component for decreasing the power mode. In such an example, the system will drop to a lower power mode faster than it will climb to a higher power mode.

In some examples, each power mode has different first power consumption threshold and time components dependent upon whether the system is powered by a battery (DC mode) or a power supply (AC mode). In such examples, the time components are relatively lower for reducing power levels when powered by a battery and relatively higher when powered by a power supply. Thus, the system will drop to a lower power level faster when being powered by a battery compared to being powered by a power supply. In another example, the time components are higher for increasing the power mode when powered by a power supply compared to time components for increasing the power mode when powered by a battery. In such examples the system will move up to a higher power mode faster when powered by a power supply as compared to when powered by a battery.

The configurable outputs 304 control the behavior of computing components in the system. For example, a power controller (i.e., fPPT) controls the frequency and voltage of a computing component. In an example power mode, the power controller limits the frequency and voltage of the computing component to save energy. In another example of a power mode, a power controller allows the frequency and voltage of the computing component to vary to compensate for a load on the computing component. In another example of a power mode, the power controller allows the frequency and voltage of the power component to operate at a maximum level to maximize performance. Other power modes cause a power controller to behave differently than these examples. Additionally, in some examples, a power mode controls a cooling policy (i.e. Fan_ID). In an example power mode, the cooling policy specifies that the fan speed be as low as possible. In another example power mode, the cooling policy specifies that that fan speed adjust to maintain a set temperature. In another example power mode, the cooling policy specifies that the fans run at maximum speed.

Figure 4:
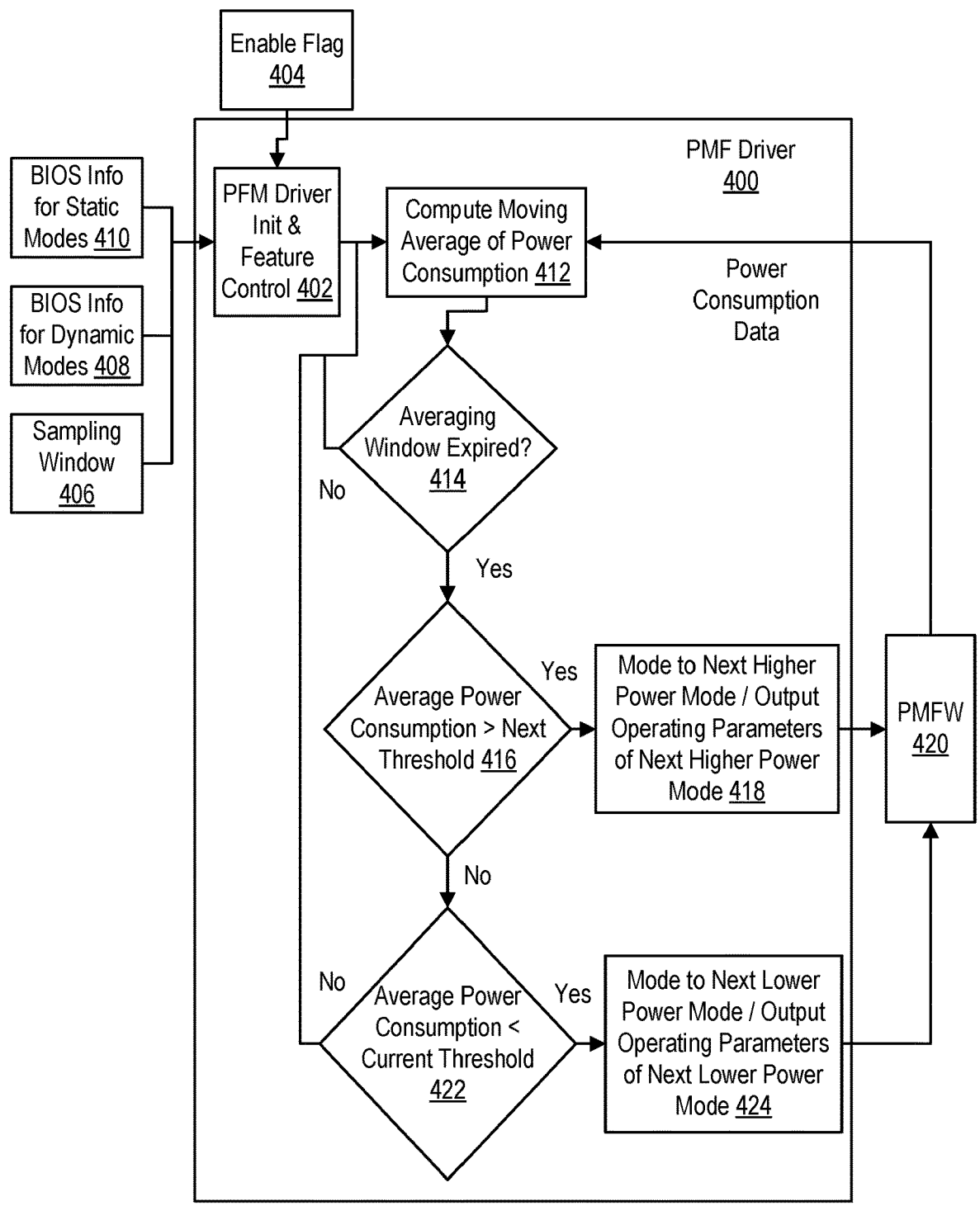
FIG. 4 is a flowchart of an example method for selecting a power mode according to some implementations.

FIG. 4 sets forth a flow chart illustrating an example of a decision process by a PMF driver 400 for determining whether to change power modes in a computing system, such as the system 100 of FIG. 1. In block 402 the PMF driver 400 receives a flag 404 indicating that the software switch has enabled the dynamic adjustment of power modes, a sampling window size 406 indicating how often to sample the power consumption, BIOS ACPI information 408 for dynamic power modes, and BIOS ACPI information for static power modes 410.

At block 412, the PMF driver 400 computes a moving average of a computing component power consumption. At decision 414, the PMF driver 400 determines if the averaging time window has expired. If not, the PMF driver 400 continues to compute the average computing component power consumption. If the time averaging window has expired, the PMF driver 400 proceeds to decision block 416 and compares the average computing component power consumption to the threshold power consumption limit received from the BIOS for the next higher power mode. If the average computing component power consumption is greater than the threshold, the PMF driver 400 proceeds to block 418 and dynamically adjusts the power mode to the next higher power mode to increase the power budget of the computing component. The PMF driver 400 communicates the operational parameters of the new power mode to a PMFW driver 420 for implementation by the computing component.

If the average computing component power consumption is not greater than the threshold power usage, the PMF driver 400 moves to block 422 and compares the average computing component power consumption to the threshold power consumption of the current power mode. If the average computing component power consumption is less than the threshold of the current power mode, the PMF driver 400 moves to block 424 and dynamically adjusts the power mode to the next lower power mode. The PMF driver 400 communicates the operational parameters of the new power mode to the PMFW driver 420 for implementation by the computing component. If the average power consumption is not less than the threshold power consumption of the current power mode, the PMF driver 400 returns to block 412 and the PMFW driver 420 maintains the current operational parameters for the computing component.

In some instances, a particular application hosted by the operating system has a tendency to use all available computing resources even when it is not necessary for normal operation of the application. Such applications are problematic for dynamically adjusting power modes since such applications will eventually cause the computing system to enter the highest power mode even if the application does not actually require the full resources of the system. To alleviate the potential of a problematic application causing this to happen, an application power policy identifies applications that are known to be problematic. The application power policy further identifies an amount of resources, or "cap" the application is allowed to consume. In some examples, the cap is in the form of a percentage of CPU use, a percentage of process time, or a power consumption limit. A process scheduler of the operating system schedules the amount of time the application is active based on the cap. In some examples, the operating system identifies application that consume excessive resources and automatically sets a power cap for the application.

Figure 5:
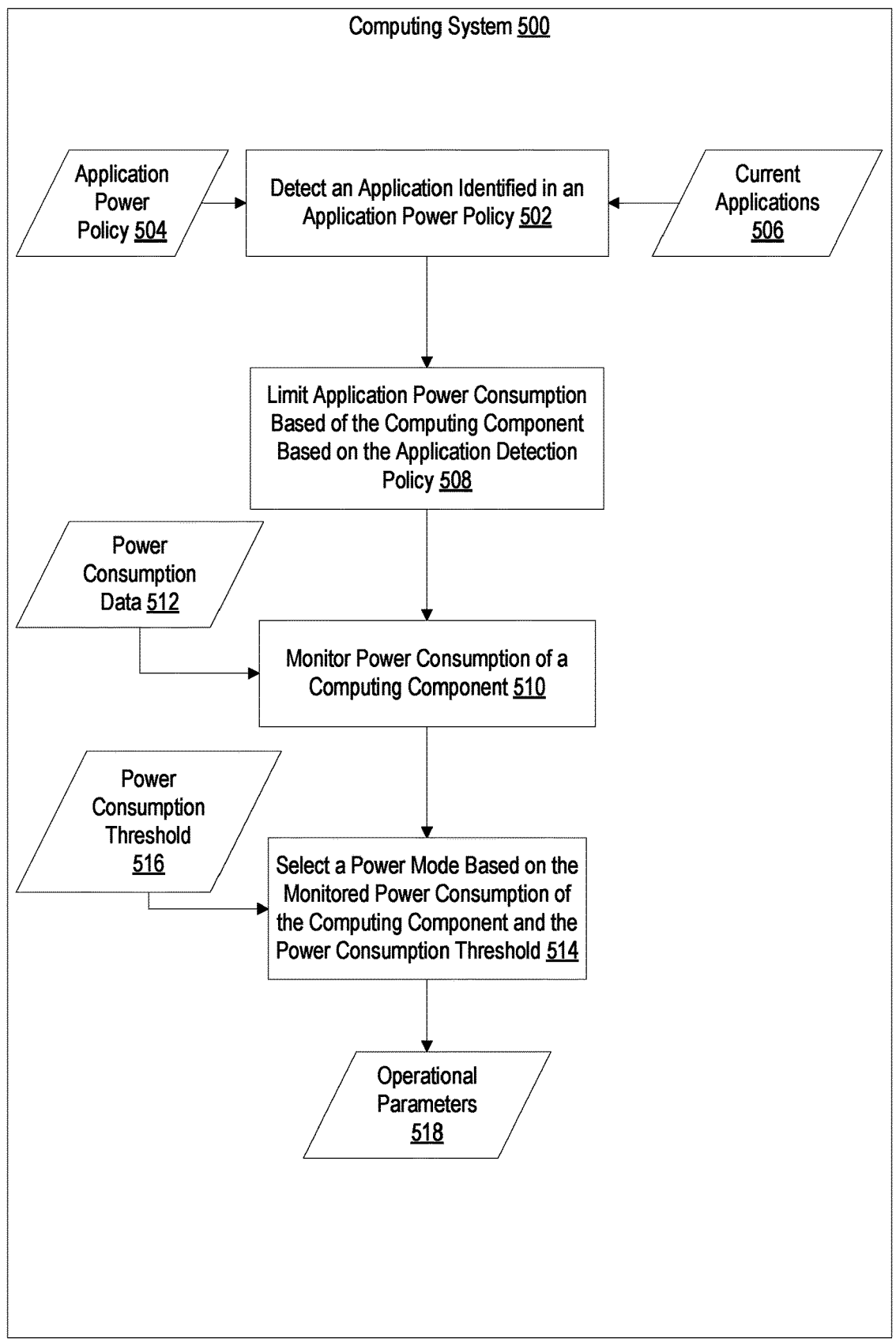
FIG. 5 is a flowchart of an example method for dynamic adjustment of power modes according to some implementations.

For further explanation, FIG. 5 sets forth a flow chart illustrating an exemplary method for power management in a computing system 500 according to implementations of the present disclosure. The method of FIG. 5 includes detecting 502, by a computing system 500, an application identified in an application power policy 504. In some examples, detecting an application identified in the application power policy 504 is carried out by finding an application described in the application power policy 504 among current applications 506. In some implementations, detection of an application includes comparing a process name or other identifier included in the application policy with process names/identifiers of the current applications and matching process names. In another implementation, the application policy contains hashes associated with problematic applications and the detection of an application includes comparing the hashes associated with problematic applications with hashes of the current applications to find matching applications.

The method of FIG. 5 also includes limiting an application's power consumption based on the application power policy. In some implementations, limiting an application's power consumption based on the application power policy is carried out by the operating system limiting the process time of the detected application. In some implementations, the operating system adjusts a process scheduler to limit the amount of time the application runs. In some examples, the amount of time the process scheduler limits the application is based on limiting the application to a limited percentage of total CPU time. In another example, the process scheduler limits the application time based on a calculated power threshold of the application. In some examples, the percentage of total CPU time or the calculated power threshold is specified in the application power policy.

The method of FIG. 5 also includes monitoring 510 power consumption of a computing component. In some implementations, monitoring power consumption of a computing component is carried out by a driver of the computing system 500. A computing component, such as a CPU, video accelerator, or other computing component, generates power consumption data 512 that is delivered to the driver. The power consumption data 512 indicates an amount of power consumed by the computing component. In some examples, power consumption data is broken down into individual components, or in other examples, the power consumption data is a cumulative power consumption. For example, in some implementations the power consumption data reflects all power consumed by computing devices associated with a CPU socket, whereas in other implementations, the power consumption data is broken down into power consumptions per CPU core and each logic block of a computing device.

The method of FIG. 5 also includes selecting 514 a power mode based on the monitored power consumption of the computing component and a power consumption threshold 516. In some implementations, selecting a power mode based on the monitored power consumption of the computing component is carried out by a driver of the computing system 500. In some examples, the driver compares the monitored power consumption to a power consumption threshold 516 stored in the BIOS. As explained in relation to FIG. 3, the driver compares the measured power consumption to the power consumption threshold of the current power mode and the power consumption threshold of a lower power mode. Based on the comparison, the driver either moves up a mode, drops down a power mode, or maintains the same power mode. After selecting the power mode, the driver then outputs computing device parameters specificied in the BIOS to the computing device. In some examples, the driver outputs at least one of a power limit, a maximum frequency, a minimum frequency, and a governor policy.

Figure 6:
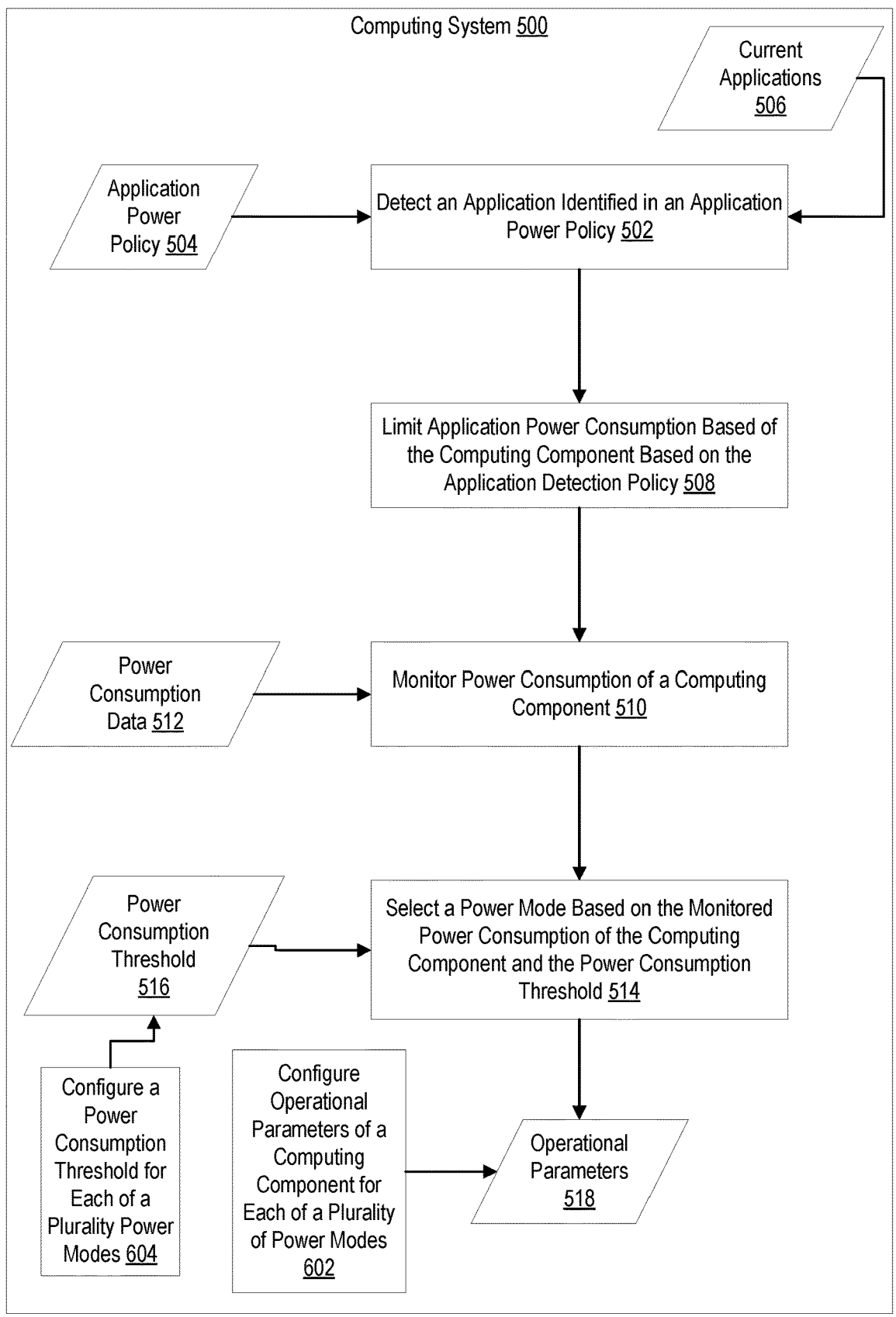
FIG. 6 is a flowchart of an example method for dynamic adjustment of power modes according to some implementations.

For further explanation, FIG. 6 sets forth a flow chart illustrating another example method for power management in a computing device according to implementations of the present disclosure. The method of FIG. 6 is similar to the method of FIG. 5 and differs in that the method of FIG. 6 also includes configuring 602, for each of a plurality of power modes, operational parameters of a plurality of computing components. The operational parameters of the plurality of computing components include the operational parameters of FIG. 5. In some examples, configuring the operational parameters of the computing components for each of the different power modes is carried out by loading operational parameters for each power mode for each computing component during BIOS initialization. In some examples, a manufacturer preloads operational parameters which are then loaded into the BIOS at the time of BIOS initialization. In other examples, the operational parameters are hard coded into the BIOS. In still other examples, the operational parameters are loaded into a power management framework driver on demand.

The method of FIG. 6 also includes configuring 604 a plurality of power consumption thresholds for each of the plurality of power modes. The plurality of power consumption thresholds includes the power consumption threshold of FIG. 5. In some examples, configuring a plurality of power consumption thresholds for each of the plurality of power modes is carried out by loading the plurality of power consumption thresholds for each power mode during BIOS initialization. In some examples, a manufacturer preloads the plurality of power consumption thresholds which are then loaded into the BIOS at the time of BIOS initialization. In other examples, the plurality of power consumption thresholds is hard coded into the BIOS. In still other examples, the plurality of power consumption thresholds is loaded into a power management framework driver on demand.

Figure 7:
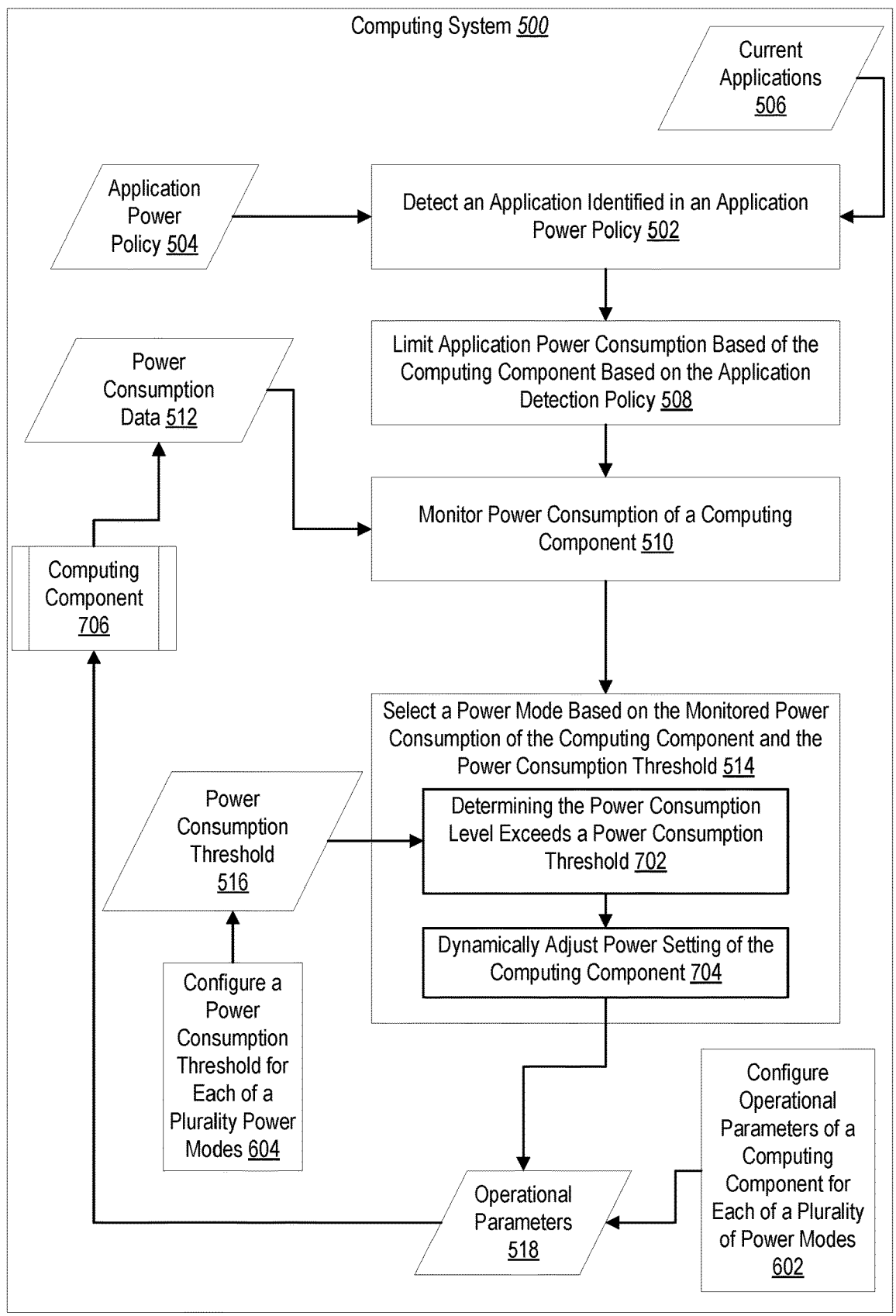
FIG. 7 is a flowchart of an example method for dynamic adjustment of power modes according to some implementations.

For further explanation, FIG. 7 sets forth a flow chart illustrating an addition to the example method of FIG. 6. In the method of FIG. 7, selecting 514 a power mode includes, while operating in a first power mode among the plurality of power modes, determining 702 that a current power consumption of the computing components exceeds a first power consumption threshold among the plurality of power consumption thresholds 516. In some examples, determining 702 that the current power consumption exceeds the first power consumption threshold is carried out by comparing the monitored power consumption to the power consumption threshold of the next higher power mode. In another example, determining 702 that the current power consumption exceeds the first power consumption threshold is carried out by comparing the current power consumption to the power consumption threshold of the current power mode. In some examples, the current power consumption is averaged or otherwise normalized before comparing it to the power consumption threshold.

Also in the method of FIG. 7, selecting 514 the power mode includes switching to a second power mode by dynamically adjusting 704 power settings of a computing component 706 based on the operational parameters 518 associated with the second power mode. In some examples, dynamically adjusting the power setting of the computing component is carried out by the PDM driver sending operational parameters 518 to the computing component 706, or in some examples, the PDM driver sends the operational parameters to a PDFM driver to implement the changes in the operational parameters at the computing component.

Figure 8:
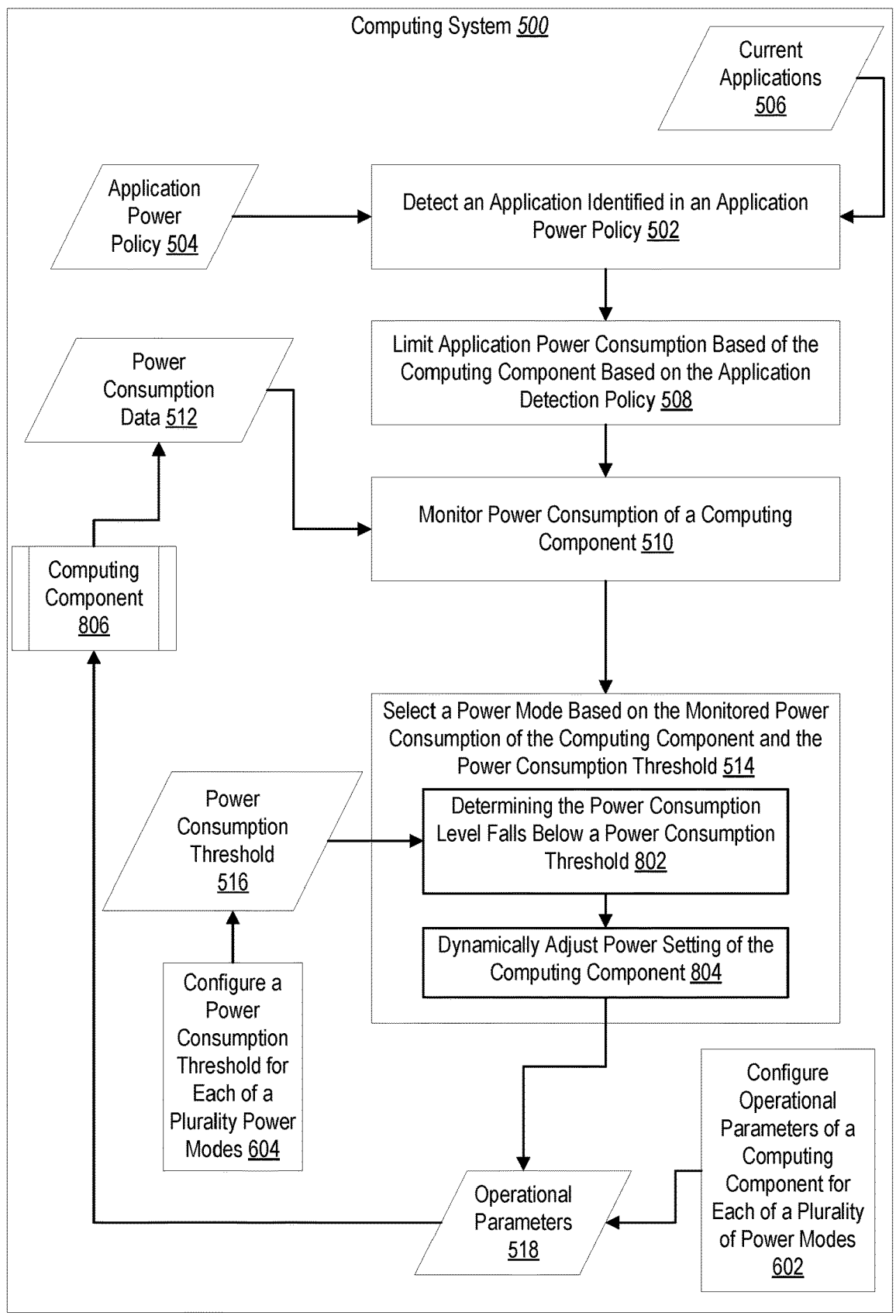
FIG. 8 is a flowchart of an example method for dynamic adjustment of power modes according to some implementations.

For further explanation, FIG. 8 sets forth a flow chart of another method expanding on the method of FIG. 6. In the method of FIG. 8, selecting 514 the power mode includes, while operating in a first power mode, determining 802 that a current power consumption of the computing components falls below a power consumption threshold among the plurality of power consumption thresholds 516. In some examples, determining 802 that the current power consumption falls below the power consumption threshold is carried out by comparing the monitored power consumption to the power consumption threshold of the current power mode, while in other examples, the current power consumption is compared to the power consumption threshold of the next higher power mode. As mentioned above, in some examples, the current power consumption is averaged or otherwise normalized before comparing it to the power consumption threshold.

Also in the method of FIG. 8, selecting 514 the power mode includes switching to a second power mode by dynamically adjusting 804 power settings of a computing component 806 based on the operational parameters 518 associated with the second power mode. In some examples, dynamically adjusting the power setting of the computing component is carried out by the PDM driver sending operational parameters 518 to the computing component 806, or in some examples, the PDM driver sends the operational parameters to a PDFM driver to implement the changes in the operational parameters at the computing component 806.

In view of the explanations set forth above, readers will recognize that the benefits of dynamic adjustment of power modes include:

Improved user experience through not having to manually select a power mode.
Increased customizability by an OEM to tailor power management to a specific device.
Increased energy savings through smart adjustment of power modes.

Exemplary implementations of the present disclosure are described largely in the context of a fully functional computer system for dynamic adjustment of power modes. Readers of skill in the art will recognize, however, that in some examples, the present disclosure is embodied as a computer program product disposed upon computer readable storage media for use with any suitable data processing system. Such computer readable storage media include any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present disclosure includes a system, a method, or a computer program product. The computer program product includes a computer readable storage medium (or media) having computer readable program instructions thereon for causing a processor to carry out aspects of the present disclosure.

The computer readable storage medium includes a tangible device that retains and stores instructions for use by an instruction execution device. Examples of a computer readable storage medium include, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein include instructions downloaded to respective computing/processing devices from a computer readable storage medium or to an external computer or external storage device via a network, for example, the Internet, a local area network, a wide area network or a wireless network. In some examples, the network includes copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some examples, the computer readable program instructions execute entirely on the user's computer, partly on the user's computer, as a stand-alone software package, partly on the user's computer and partly on a remote computer or entirely on the remote computer or server. In the latter scenario, the remote computer is connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present disclosure.

Aspects of the present disclosure are described herein with reference to flowchart illustrations or block diagrams of methods, apparatus (systems), and computer program products according to embodiments of the disclosure. It will be understood that each block of the flowchart illustrations or block diagrams, and combinations of blocks in the flowchart illustrations or block diagrams, are implemented by computer readable program instructions.

These computer readable program instructions are provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. In some examples, these computer readable program instructions are stored in a computer readable storage medium that direct a computer, a programmable data processing apparatus, or other devices to function in a particular manner, such that the computer readable storage medium having instructions stored therein includes an article of manufacture including instructions which implement aspects of the function/act specified in the flowchart or block diagram block or blocks.

In some examples, the computer readable program instructions are loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart or block diagram block or blocks.

The flowchart and block diagrams in the Figures illustrate the architecture, functionality, and operation of possible implementations of systems, methods, and computer program products according to various embodiments of the present disclosure. In this regard, in some examples, each block in the flowchart or block diagrams represents a module, segment, or portion of instructions, which includes one or more executable instructions for implementing the specified logical function(s). In some alternative implementations, the functions noted in the block occur out of the order noted in the figures. For example, two blocks shown in succession are executed substantially concurrently, or the blocks are sometimes executed in the reverse order, depending upon the functionality involved. It will also be noted that in some examples, each block of the block diagrams or flowchart illustration, and combinations of blocks in the block diagrams or flowchart illustration, are implemented by special purpose hardware-based systems that perform the specified functions or acts or carry out combinations of special purpose hardware and computer instructions.

It will be understood from the foregoing description that modifications and changes can be made in various embodiments of the present disclosure. The descriptions in this specification are for purposes of illustration only and are not to be construed in a limiting sense. The scope of the present disclosure is limited only by the language of the following claims.

What is claimed is:

1. An apparatus for dynamic adjustment of power modes, the apparatus comprising:
   a computer processor; and
   a computer memory operatively coupled to the computer processor, the computer memory having disposed therein computer program instructions executable by the computer processor to:
      monitor power consumption of a computing component of a plurality of computing components included in a computing system;
      select a power mode for the computing system based on the monitored power consumption of the computing component, wherein the power mode manages power consumption of a plurality of computing components included within the computing system; and
      limit an application power consumption of the computing component based on an application power policy associated with an application identifier, and independent of the power mode selected.

2. The apparatus of claim 1, wherein the power mode is selected based on determining whether the apparatus is powered by a battery or a power supply.

3. The apparatus of claim 1, wherein the computer program instructions are executable by the computer processor to:
   configure, for each of the plurality of power modes, operational parameters of the computing component; and
   configure a plurality of power consumption thresholds for each of the plurality of power modes, wherein the power mode is among the plurality of power modes.

4. The apparatus of claim 3, wherein selecting the power mode comprises:
   while operating in a first power mode among the plurality of power modes, determining that a current power consumption of the computing component exceeds a power consumption threshold among the plurality of power consumption thresholds; and
   switching to a second power mode among the plurality of power modes by dynamically adjusting power settings of the computing component based on the operational parameters associated with the second power mode.

5. The apparatus of claim 3, wherein selecting the power mode comprises:
   while operating in a first power mode, determining that a current power consumption falls below the power consumption threshold; and
   switching to a second power mode including dynamically re-adjusting power settings of the computing component based on the operational parameters associated with the second power mode.

6. The apparatus of claim 1, wherein the application power consumption of the computing component is limited to a power threshold specified for the computing component in the application power policy.

7. The apparatus of claim 3, wherein the computer program instructions further cause the apparatus to carry out receiving the operational parameters and the power consumption thresholds for each of the power modes by executing an Advanced Configuration and Power Interface (ACPI) call instruction.

8. The apparatus of claim 4, wherein configuring the plurality of power consumption thresholds for each one of the plurality of power modes includes at least one of setting a maximum voltage of the computing component, setting a maximum clock frequency of the computing component, setting a minimum clock frequency of the computing component, setting a maximum temperature of the computing component, setting a minimum temperature of the computing component, setting a minimum fan speed, and setting a maximum fan speed.

9. A method of dynamic adjustment of power modes, the method comprising:
    monitoring power consumption of a computing component of a plurality of computing components included in a computing system;
    selecting a power mode for the computing system based on the monitored power consumption of the computing component, wherein the power mode manages power consumption of the plurality of computing components included within the computing system; and
    limiting an application power consumption of the computing component based on an application power policy associated with an application identifier, and independent of the power mode selected.

10. The method of claim 9, wherein monitoring the power consumption of the computing component is performed by a power management framework (PMF) driver, wherein the PMF driver monitors power consumption of each of the plurality of computing components included in the computing system.

11. The method of claim 9, further comprising:
    configuring, for each of the plurality of power modes, operational parameters of the computing component; and
    configuring a plurality of power consumption thresholds for each of the plurality of power modes, wherein the power mode is among the plurality of power modes.

12. The method of claim 11, wherein selecting the power mode comprises:
    while operating in a first power mode among the plurality of power modes, determining that a current power consumption of the computing component exceeds a power consumption threshold among the plurality of power consumption thresholds; and
    switching to a second power mode among the plurality of power modes by dynamically adjusting power settings of the computing component based on the operational parameters associated with the second power mode.

13. The method of claim 11, wherein selecting the power mode comprises:
    while operating in a first power mode, determining that a current power consumption falls below the power consumption threshold; and
    switching to a second power mode including dynamically re-adjusting power settings of the computing component based on the operational parameters associated with the second power mode.

14. The method of claim 9, wherein selecting the power mode is based on the monitored power consumption of two or more of the plurality of computing components.

15. The method of claim 11, further comprising receiving the operational parameters and the plurality of power consumption thresholds for each one of the plurality of power modes from a third party entity by executing an Advanced Configuration and Power Interface (ACPI) call instruction.

16. The method of claim 11, wherein configuring the plurality of power consumption thresholds for each one of the plurality of power modes includes at least one of setting a maximum voltage of the computing component, setting a maximum clock frequency of the computing component, setting a minimum clock frequency of the computing component, setting a maximum temperature of the computing component, setting a minimum temperature of the computing component, setting a minimum fan speed, and setting a maximum fan speed.

17. A computer program product for dynamic adjustment of power modes, the computer program product disposed upon a computer readable medium, the computer program product comprising computer program instructions that, when executed, cause a computer to carry out:
    monitoring power consumption of a computing component of a plurality of computing components included in a computing system;
    selecting a power mode for the computing system based on the monitored power consumption of the computing component, wherein the power mode manages power consumption of the plurality of computing components included within the computing system; and
    limiting an application power consumption of the computing component based on an application power policy associated with an application identifier, and independent of the power mode selected.

18. The computer program product of claim 17, wherein the computer program instructions further cause the computer to carry out:
    configuring, for each of the plurality of power modes, operational parameters of the computing component; and
    configuring a plurality of power consumption thresholds for each of the plurality of power modes, wherein the power mode is among the plurality of power modes.

19. The computer program product of claim 18, wherein the computer program instructions further cause the computer to carry out:
    while operating in a first power mode among the plurality of power modes, determining that a current power consumption of the computing component exceeds a power consumption threshold among the plurality of power consumption thresholds; and
    switching to a second power mode among the plurality of power modes by dynamically adjusting power settings of the computing component based on the operational parameters associated with the second power mode.

20. The computer program product of claim 18, wherein the computer program instructions further cause the computer to carry out:
    while operating in a first power mode, determining that that a current power consumption falls below the power consumption threshold; and
    switching to a second power mode including dynamically re-adjusting power settings of the computing component based on the operational parameters associated with the second power mode.

21. The computer program product of claim 17, wherein selecting the power mode is based on whether a computing device including the computing component is powered by a battery or a power supply.

22. The computer program product of claim 18, wherein configuring the plurality of power consumption thresholds for each one of the plurality of power modes further includes at least one of setting a maximum, voltage of the computing component, setting a maximum clock frequency of the computing component, setting a minimum clock frequency of the computing component, setting a maximum temperature of the computing component, setting a minimum temperature of the computing component, setting a minimum fan speed, and setting a maximum fan speed.

* * * * *